United States Patent
Malpass

(10) Patent No.: US 10,075,502 B2
(45) Date of Patent: Sep. 11, 2018

(54) SYSTEMS AND METHODS FOR WEB API COMMUNICATION

(71) Applicant: Fasetto, LLC, Superior, WI (US)

(72) Inventor: Luke Malpass, Stoke-on-Trent (GB)

(73) Assignee: FASETTO, INC., Superior, WI (US)

( * ) Notice: Subject to any disclaimer, the term of this patent is extended or adjusted under 35 U.S.C. 154(b) by 199 days.

(21) Appl. No.: 15/065,713

(22) Filed: Mar. 9, 2016

(65) Prior Publication Data

US 2016/0269468 A1    Sep. 15, 2016

Related U.S. Application Data

(60) Provisional application No. 62/131,619, filed on Mar. 11, 2015.

(51) Int. Cl.
  *H04L 29/08*    (2006.01)
  *H04L 12/26*    (2006.01)

(52) U.S. Cl.
  CPC ............. *H04L 67/02* (2013.01); *H04L 43/10* (2013.01); *H04L 67/141* (2013.01); *H04L 67/32* (2013.01)

(58) Field of Classification Search
  CPC ....... H04L 43/10; H04L 67/02; H04L 67/141; H04L 67/32
  See application file for complete search history.

(56) References Cited

U.S. PATENT DOCUMENTS

| | | | |
|---|---|---|---|
| 5,303,388 A | 4/1994 | Kreitman | |
| 5,664,228 A | 9/1997 | Mital | |
| 5,678,015 A | 10/1997 | Goh | |
| 5,689,287 A | 11/1997 | Mackinlay | |
| 5,729,471 A | 3/1998 | Jain | |
| 5,956,038 A | 9/1999 | Rekimoto | |
| 5,963,215 A | 10/1999 | Rosenzweig | |
| 6,002,403 A | 12/1999 | Sugiyama | |
| 6,008,809 A | 12/1999 | Brooks | |
| 6,029,183 A | 2/2000 | Jenkins | |
| 6,489,932 B1 | 12/2002 | Chitturi | |
| 6,497,367 B2 | 12/2002 | Conzola et al. | |
| 6,581,068 B1 | 6/2003 | Bensoussan | |

(Continued)

FOREIGN PATENT DOCUMENTS

| CN | 1881164 | 12/2006 |
|---|---|---|
| CN | 102591571 A | 7/2012 |

(Continued)

OTHER PUBLICATIONS

USPTO; Office Action dated Oct. 6, 2016 in U.S. Appl. No. 14/197,517.

(Continued)

*Primary Examiner* — Alina A Boutah
(74) *Attorney, Agent, or Firm* — Snell & Wilmer, L.L.P.

(57) ABSTRACT

A method of communication between devices is provided. The method comprises receiving a connection request, establishing a connection in response to the connection request, and receiving a first web API request on the connection. The method further comprises executing a first procedure in response to the first web API request, receiving a second web API request on the connection, and executing at least one of the first procedure or a second procedure in response to the second web API request.

25 Claims, 5 Drawing Sheets

(56) References Cited

U.S. PATENT DOCUMENTS

| | | |
|---|---|---|
| 6,597,358 B2 | 7/2003 | Miller |
| 6,710,788 B1 | 3/2004 | Freach et al. |
| 6,922,815 B2 | 7/2005 | Rosen |
| 6,938,218 B1 | 8/2005 | Rosen |
| 7,054,963 B2 | 5/2006 | Betts-Lacroix |
| 7,134,095 B1 | 11/2006 | Smith |
| 7,149,836 B2 | 12/2006 | Yu |
| 7,216,305 B1 | 5/2007 | Jaeger |
| 7,428,702 B1 | 9/2008 | Cervantes et al. |
| 7,480,872 B1 | 1/2009 | Ubillos |
| 7,516,484 B1 | 4/2009 | Arnouse |
| 7,533,408 B1 | 5/2009 | Arnouse |
| 7,725,839 B2 | 5/2010 | Michaels |
| 7,761,813 B2 | 7/2010 | Kim |
| D654,931 S | 2/2012 | Lemelman |
| 8,111,255 B2 | 2/2012 | Park |
| 8,117,563 B2 | 2/2012 | Ok |
| 8,264,488 B2 | 9/2012 | Ueno |
| 8,386,686 B2 | 2/2013 | Lin |
| 8,390,255 B1 | 3/2013 | Fathollahi |
| 8,405,502 B2 | 3/2013 | Teague |
| 8,497,859 B1 | 7/2013 | Hickman et al. |
| 8,510,680 B2 | 8/2013 | Kang |
| 8,614,885 B2 | 12/2013 | Solomon |
| 8,699,218 B2 | 4/2014 | Xu |
| 8,745,535 B2 | 6/2014 | Chaudhri |
| 8,810,430 B2 | 8/2014 | Proud |
| 8,935,438 B1 | 1/2015 | Ivanchenko |
| 9,047,050 B2 | 6/2015 | Medica |
| 9,178,976 B2 | 11/2015 | Djordjevic |
| 9,247,303 B2 | 1/2016 | Phang |
| 9,288,295 B2 | 3/2016 | Ivanovski |
| 9,360,991 B2 | 6/2016 | Celebisoy |
| 9,378,588 B2 | 6/2016 | Song |
| 9,390,082 B1 | 7/2016 | Stolte et al. |
| 9,405,435 B2 | 8/2016 | Hendricks |
| 9,437,038 B1 | 9/2016 | Costello |
| 9,495,375 B2 | 11/2016 | Huang |
| 9,684,887 B2 | 6/2017 | Majeti et al. |
| 9,886,229 B2 | 2/2018 | Christmas |
| 2001/0028369 A1 | 10/2001 | Gallo et al. |
| 2001/0044578 A1 | 11/2001 | Ben-Haim |
| 2002/0085681 A1 | 7/2002 | Jensen |
| 2002/0105529 A1 | 8/2002 | Bowser et al. |
| 2002/0105551 A1 | 8/2002 | Kamen |
| 2003/0074529 A1 | 4/2003 | Crohas |
| 2003/0126335 A1 | 7/2003 | Silvester |
| 2003/0131050 A1 | 7/2003 | Vincent |
| 2003/0142136 A1 | 7/2003 | Carter |
| 2004/0088280 A1 | 5/2004 | Koh et al. |
| 2004/0104932 A1 | 6/2004 | Brebner |
| 2004/0205091 A1 | 10/2004 | Mulcahy |
| 2005/0005246 A1 | 1/2005 | Card |
| 2005/0097008 A1 | 5/2005 | Ehring |
| 2005/0185364 A1 | 8/2005 | Bell |
| 2005/0224589 A1 | 10/2005 | Park et al. |
| 2006/0090122 A1 | 4/2006 | Pyhalammi et al. |
| 2006/0239375 A1 | 10/2006 | Kim et al. |
| 2006/0294386 A1 | 12/2006 | Yuval et al. |
| 2007/0050778 A1 | 3/2007 | Lee |
| 2007/0120846 A1 | 5/2007 | Ok et al. |
| 2007/0130541 A1 | 6/2007 | Louch |
| 2007/0158408 A1 | 7/2007 | Wang et al. |
| 2007/0160198 A1 | 7/2007 | Orsini et al. |
| 2007/0168614 A1 | 7/2007 | Jianjun et al. |
| 2007/0273675 A1 | 11/2007 | Wangler |
| 2007/0279852 A1 | 12/2007 | Daniel et al. |
| 2007/0282601 A1 | 12/2007 | Li |
| 2008/0024976 A1 | 1/2008 | Hardson et al. |
| 2008/0069358 A1 | 3/2008 | Yang |
| 2008/0181141 A1 | 7/2008 | Krantz |
| 2008/0186305 A1 | 8/2008 | Carter |
| 2008/0222238 A1* | 9/2008 | Ivanov .................. H04L 67/16 709/202 |
| 2008/0223890 A1 | 9/2008 | Tecchiolli et al. |
| 2008/0235629 A1 | 9/2008 | Porter et al. |
| 2008/0241809 A1 | 10/2008 | Ashmore |
| 2008/0250179 A1 | 10/2008 | Moon |
| 2008/0305738 A1 | 12/2008 | Khedouri et al. |
| 2008/0313450 A1 | 12/2008 | Rosenberg |
| 2008/0317068 A1 | 12/2008 | Sagar |
| 2009/0009605 A1 | 1/2009 | Ortiz |
| 2009/0116445 A1 | 5/2009 | Samar et al. |
| 2009/0144653 A1 | 6/2009 | Ubilos |
| 2009/0239468 A1 | 9/2009 | He |
| 2009/0240598 A1 | 12/2009 | Kargman |
| 2009/0300025 A1 | 12/2009 | Rothschild et al. |
| 2010/0001168 A1 | 1/2010 | Yong et al. |
| 2010/0020035 A1 | 1/2010 | Ryu et al. |
| 2010/0078343 A1 | 4/2010 | Hoellwarth |
| 2010/0088634 A1 | 4/2010 | Akira et al. |
| 2010/0093412 A1 | 4/2010 | Serra |
| 2010/0122207 A1 | 5/2010 | Kim et al. |
| 2010/0169639 A1 | 7/2010 | Jeffries |
| 2010/0169836 A1 | 7/2010 | Stallings |
| 2010/0225735 A1 | 9/2010 | Shaffer |
| 2010/0238089 A1 | 9/2010 | Massand |
| 2010/0256624 A1 | 10/2010 | Brannon |
| 2010/0268929 A1 | 10/2010 | Fumiyoshi |
| 2010/0309228 A1 | 12/2010 | Mattos et al. |
| 2010/0313154 A1 | 12/2010 | Choi et al. |
| 2010/0315417 A1 | 12/2010 | Cho et al. |
| 2011/0051642 A1 | 3/2011 | Krishnaswamy |
| 2011/0063211 A1 | 3/2011 | Hoerl et al. |
| 2011/0090534 A1 | 4/2011 | Terao et al. |
| 2011/0107269 A1 | 5/2011 | Chiu et al. |
| 2011/0113251 A1 | 5/2011 | Lu et al. |
| 2011/0131660 A1 | 6/2011 | Claessen et al. |
| 2011/0134110 A1 | 6/2011 | Song et al. |
| 2011/0179368 A1 | 7/2011 | King et al. |
| 2011/0283208 A1 | 11/2011 | Gallo |
| 2011/0294474 A1 | 12/2011 | Barany et al. |
| 2011/0296339 A1 | 12/2011 | Kang et al. |
| 2011/0310100 A1 | 12/2011 | Adimatyam et al. |
| 2012/0011200 A1 | 1/2012 | Zhang et al. |
| 2012/0047517 A1 | 2/2012 | Townsend et al. |
| 2012/0128172 A1 | 5/2012 | Alden |
| 2012/0155510 A1 | 6/2012 | Hirsch et al. |
| 2012/0166953 A1 | 6/2012 | Affronti et al. |
| 2012/0194976 A1 | 8/2012 | Golko et al. |
| 2012/0200567 A1 | 8/2012 | Mandel |
| 2012/0209630 A1 | 8/2012 | Ihm et al. |
| 2012/0260218 A1 | 10/2012 | Bawel |
| 2012/0267432 A1 | 10/2012 | Kuttuva |
| 2012/0282858 A1 | 11/2012 | Gill et al. |
| 2012/0293509 A1 | 11/2012 | Barnsley |
| 2013/0073692 A1 | 3/2013 | Isaza |
| 2013/0077529 A1 | 3/2013 | Lueckenhoff et al. |
| 2013/0080541 A1 | 3/2013 | Herbert |
| 2013/0097239 A1 | 4/2013 | Brown et al. |
| 2013/0125000 A1 | 5/2013 | Fleischhauer |
| 2013/0159080 A1 | 6/2013 | Wu et al. |
| 2013/0159178 A1 | 6/2013 | Colon et al. |
| 2013/0163195 A1 | 6/2013 | Pelletier |
| 2013/0201176 A1 | 8/2013 | Lee |
| 2013/0205277 A1 | 8/2013 | Seven et al. |
| 2013/0219479 A1 | 8/2013 | Desoto et al. |
| 2013/0235037 A1 | 9/2013 | Baldwin |
| 2013/0238711 A1 | 9/2013 | Lashkari et al. |
| 2013/0256403 A1 | 10/2013 | Mackinnon |
| 2013/0266065 A1 | 10/2013 | Paczkowski |
| 2013/0268802 A1 | 10/2013 | Ito et al. |
| 2013/0272196 A1 | 10/2013 | Li |
| 2013/0273983 A1 | 10/2013 | Hsu |
| 2013/0300740 A1 | 11/2013 | Snyder |
| 2013/0303160 A1 | 11/2013 | Fong |
| 2013/0317835 A1 | 11/2013 | Matthew |
| 2014/0012913 A1 | 1/2014 | Varoglu et al. |
| 2014/0026204 A1 | 1/2014 | Buntinx et al. |
| 2014/0039804 A1 | 2/2014 | Park et al. |
| 2014/0040777 A1 | 2/2014 | Jones |
| 2014/0055822 A1 | 2/2014 | Hannaway et al. |
| 2014/0078136 A1 | 3/2014 | Sohn |
| 2014/0082547 A1 | 3/2014 | Ding |

(56) References Cited

U.S. PATENT DOCUMENTS

| | | |
|---|---|---|
| 2014/0106677 A1 | 4/2014 | Altman |
| 2014/0132594 A1 | 5/2014 | Gharpure |
| 2014/0132736 A1 | 5/2014 | Chang |
| 2014/0141713 A1 | 5/2014 | Shirinfar |
| 2014/0156725 A1* | 6/2014 | Mandyam .............. H04L 67/02 709/203 |
| 2014/0189532 A1 | 7/2014 | Sivaraman et al. |
| 2014/0207657 A1 | 7/2014 | Gacs et al. |
| 2014/0232817 A1 | 8/2014 | Jones |
| 2014/0258938 A1 | 9/2014 | Christmas |
| 2014/0337640 A1 | 11/2014 | Sharma |
| 2014/0351181 A1 | 11/2014 | Canoy et al. |
| 2015/0009531 A1 | 1/2015 | Kawaguchi |
| 2015/0012617 A1 | 1/2015 | Park et al. |
| 2015/0019628 A1* | 1/2015 | Li ........................... H04L 67/02 709/203 |
| 2015/0095777 A1* | 4/2015 | Lim ........................ H04L 67/02 715/716 |
| 2015/0101018 A1 | 4/2015 | Forte |
| 2015/0106837 A1* | 4/2015 | Li ........................ H04N 21/8586 725/30 |
| 2015/0145889 A1 | 5/2015 | Hanai |
| 2015/0271271 A1* | 9/2015 | Bullotta ............... H04L 67/141 709/228 |
| 2015/0271299 A1* | 9/2015 | Bullotta .................. H04L 69/08 709/230 |
| 2015/0281439 A1 | 10/2015 | Dudai |
| 2015/0339867 A1 | 11/2015 | Amon |
| 2015/0367230 A1 | 12/2015 | Bradford |
| 2015/0382169 A1 | 12/2015 | Burba |
| 2016/0037055 A1 | 2/2016 | Waddington |
| 2016/0100279 A1 | 4/2016 | Christmas et al. |
| 2016/0134941 A1* | 5/2016 | Selvaraj .......... H04N 21/26283 725/40 |
| 2016/0162244 A1 | 6/2016 | Christmas |
| 2016/0188468 A1* | 6/2016 | Rao ........................ G06F 9/547 711/144 |
| 2016/0226730 A1* | 8/2016 | Schumacher ......... G06Q 10/00 |
| 2016/0260319 A1* | 9/2016 | Jeffery ................... G08C 17/02 |
| 2017/0160992 A1 | 6/2017 | Christmas |
| 2017/0371378 A1 | 12/2017 | Christmas |
| 2018/0146378 A1 | 5/2018 | Christmas |

FOREIGN PATENT DOCUMENTS

| | | |
|---|---|---|
| CN | 103546181 A | 1/2014 |
| EP | 0800144 | 10/1997 |
| EP | 1168769 A2 | 2/2002 |
| EP | 1761048 A2 | 3/2007 |
| EP | 1806649 A1 | 7/2007 |
| GB | 2018098313 | 5/2018 |
| JP | 09-091155 | 4/1997 |
| JP | 2007-049606 | 2/2007 |
| JP | 2010-535351 | 11/2010 |
| JP | 2011-134159 | 7/2011 |
| JP | 2011-147136 | 7/2011 |
| JP | 2011-248489 | 12/2011 |
| KR | 10-20100056594 | 5/2010 |
| KR | 10-20120092487 A | 8/2012 |
| TW | 201214150 | 4/2012 |
| TW | 201320681 | 5/2013 |
| TW | 201349811 | 12/2013 |
| WO | 2000033545 | 6/2000 |
| WO | WO 2005050393 | 6/2005 |
| WO | WO 2006107324 | 10/2006 |
| WO | WO 2006125027 | 11/2006 |
| WO | 2007076494 A2 | 7/2007 |
| WO | 2007103908 A2 | 9/2007 |
| WO | 2008090902 | 7/2008 |
| WO | WO 2009016612 | 2/2009 |
| WO | WO 2010018551 | 8/2010 |
| WO | 2012087847 A2 | 6/2012 |
| WO | 2014012486 | 1/2014 |
| WO | WO 2014016622 | 1/2014 |
| WO | 2014085502 | 6/2014 |
| WO | 2014138187 | 9/2014 |
| WO | 2014151925 A1 | 9/2014 |
| WO | WO 2014141235 | 9/2014 |
| WO | 2015048684 | 4/2015 |
| WO | 2015112506 | 7/2015 |
| WO | 2016007780 | 1/2016 |
| WO | 2016057091 | 4/2016 |
| WO | 2016145126 | 9/2016 |
| WO | 2017096245 | 6/2017 |

OTHER PUBLICATIONS

USPTO; Final Office Action dated Oct. 26, 2016 in U.S. Appl. No. 14/500,363.
USPTO; Final Office Action dated Oct. 11, 2016 in U.S. Appl. No. 14/709,231.
USPTO; Notice of Allowance dated Oct. 14, 2016 in U.S. Appl. No. 14/164,919.
USPTO; Final Office Action dated Dec. 20, 2016 in U.S. Appl. No. 14/745,100.
USPTO; Office Action dated Nov. 25, 2016 in U.S. Appl. No. 14/795,210.
USPTO; Office Action dated Apr. 7, 2017 in U.S. Appl. No. 14/500,363.
USPTO; Office Action dated Apr. 14, 2017 in U.S. Appl. No. 14/905,639.
USPTO; Office Action dated Apr. 6, 2017 in U.S. Appl. No. 14/709,231.
USPTO; Office Action dated May 4, 2017 in U.S. Appl. No. 14/745,100.
USPTO; Final Office Action dated Jun. 30, 2017 in U.S. Appl. No. 14/197,517.
USPTO; Final Office Action dated Aug. 17, 2017 in U.S. Appl. No. 14/795,210.
USPTO; Notice of Allowance dated Oct. 11, 2017 in U.S. Appl. No. 14/905,639.
USPTO; Final Office Action dated Sep. 25, 2017 in U.S. Appl. No. 14/500,363.
USPTO; Final Office action dated Sep. 29, 2017 in U.S. Appl. No. 14/709,231.
USPTO; Office Action dated Oct. 25, 2017 in U.S. Appl. No. 15/435,884.
USPTO; Final Office Action dated Oct. 13, 2017 in U.S. Appl. No. 14/745,100.
EP; Supplemental Search Report dated Oct. 20, 2016 in Application Serial No. 14760041.5.
EP; Extended Search Report dated Jan. 24, 2017 in Application Serial No. 14760041.5.
EP; Supplemental Search Report dated Mar. 2, 2017 in Application Serial No. 14826056.5.
EP; Extended Search Report dated Mar. 21, 2017 in Application Serial No. 14846886.1.
MX; Examination Report dated Feb. 24, 2017 in Application Serial No. 2015/006550.
MX; Examination Report dated Apr. 21, 2017 in Application Serial No. 2015/011314.
JP; Examination Report dated Jul. 28, 2017 in Application Serial No. 2015-545200.
CN; Examination Report dated Jul. 28, 2017 in Application Serial No. 20138007041.5X [Assoc did not report OA Until Sep. 27, 2017].
EP; Supplemental Search Report dated Mar. 2, 2017 in Application Serial No. 14826056.5 [Verify status of citing in other cases].
MX; 2nd Examination Report dated Oct. 24, 2017 in Application Serial No. 2015/011314.
EP; Supplemental Search Report dated Sep. 15, 2017 in Application Serial No. 15740208.2.
PCT; International Search Report and Written Opinion dated Mar. 20, 2017 in US/2016/064744.
Dusk Jockeys; Dust Jockyes Android Apps dated Mar. 7, 2012, pp. 1-5.

(56) References Cited

OTHER PUBLICATIONS

"Sue White:""Wi-Fi and Bluetooth Coexistence, Electronic Compnent News, Mar. 2, 2012, pp. 1-7, XP05504386, Retrieved from Internet: URL:https://www.ecnmag.com/article/2012/03/wi-fi-andbluetooth-coexistence [retrieved on Sep. 6, 2017]".
PCT; International Search Report and Written Opinion dated Jul. 11, 2016 in US2016/021627.
USPTO; Notice of Allowance dated Aug. 16, 2016 in U.S. Appl. No. 14/092,165.
USPO; Office Action dated Oct. 8, 2015 in U.S. Appl. No. 14/092,165.
USPTO; Office Action dated Sep. 18, 2015 in U.S. Appl. No. 14/164,919.
USPTO; Office Action dated Apr. 5, 2016 in U.S. Appl. No. 14/500,363.
USPTO; Final Office Action dated Jun. 3, 2016 in U.S. Appl. No. 14/092,165.
USPTO; Final Office Action dated Apr. 26, 2016 in U.S. Appl. No. 14/164,919.
USPTO; Office Action dated Jun. 22, 2016 in U.S. Appl. No. 14/745,100.
USPTO; Office action dated Apr. 22, 2016 in U.S. Appl. No. 14/709,231.
Sweden; Office Action dated Nov. 18, 2015 in Application Serial No. 1551071-2.
EP; Supplemental Search Report dated Jun. 14, 2016 in Application Serial No. 13859205.0.
PCT; International Search Report dated Jul. 4, 2014 in Application No. US2014/020624.
PCT; Written Opinion dated Jul. 4, 2014 in Application No. US2014/020624.
PCT; International Preliminary Report on Patentability dated Sep. 8, 2015 in Application No. US2014/020624.
PCT; International Search Report dated Nov. 13, 2014 in US2014/047054.
PCT; Written Opinion dated Nov. 13, 2014 in US2014/047054.
PCT; International Searth Report dated Jan. 6, 2015 in US2014/058126.
PCT; Written Opinion dated Jan. 6, 2015 in US2014/058126.
PCT; International Search Report dated Mar. 5, 2014 in US2013042089.
PCT; Written Opinion dated Mar. 5, 2015 in U52013/072089.
PCT; International Preliminary Report on Patentability dated Jun. 2, 2015 in US2013072089.
PCT; International Search Report dated Apr. 24, 2015 in US2015/012063.
PCT; Written Opinion dated Apr. 24, 2015 in US2015/012063.
PCT; International Search Report and Written Opinion dated Oct. 6, 2015 in US2015/036801.
PCT; International Search Report and Written Opinion dated Nov. 2, 2015 in US2015/039797.
PCT; International Preliminary Report on Patentability dated Apr. 14, 2016 in US2014/058126.
Kim, Young-Gon, and Moon-Seog Jun. A design of user authentication system using QR oode identifying method. Computer Sciences and Convergence Information Technology (ICCIT), 6th.
Application Programming Interface by David Orenstein, published Jan. 10, 2000 on Computerworld.com.
Gerd Kortuem et al., 'Architectural Issues in Supporting Ad-hoc Collaboration with Wearable Computers,' In: Proceedings of the Workshop on Software Engineering for Wearable and.
3rd party observation dated Dec. 22, 2015 against Patent Application No. 1551071-2 in Sweden.
Revault Product Data Sheet dated Mar. 19, 2015.
USPTO; Final Office Action dated Oct. 3, 2017 in U.S. Appl. No. 14/500,363.
USPTO; Notice of Allowance dated Nov. 29, 2017 in U.S. Appl. No. 14/905,639.
USPTO; Non-Final Office Action dated Dec. 12, 2017 in U.S. Appl. No. 15/367,961.
USPTO; Notice of Allowance dated Feb. 26, 2018 in U.S. Appl. No. 14/745,100.
USPTO; Non-Final Office Action dated Mar. 8, 2018 in U.S. Appl. No. 14/197,517.
EP; Extended Search Report dated Sep. 17, 2015 in Application Serial No. 15740208.2.
MX; Office Action dated Jan. 23, 2018 in Application Serial No. MX/a/2016/003798.
TW; Office Action dated Jan. 24, 2018 in Application Serial No. 104102514.
EP; Extended Search Report dated Apr. 9, 2018 in Application Serial No. 15848371.9.
EP; Extended Search Report dated Apr. 24, 2018 in Application Serial No. 15819468.8.
JP; Office Action dated Aug. 2, 2017 in Application Serial No. 2015-545200.
JP; Office Action dated Feb. 2, 2018 in Application Serial No. 2016-S49317.
USPTO; Notice of Allowance dated May 17, 2018 in U.S. Appl. No. 14/709,231.
USPTO; Non-Final Office Action dated May 18, 2018 in U.S. Appl. No. 15/644,556.
USPTO; Notice of Allowance dated May 22, 2018 in U.S. Appl. No. 15/435,884.
CN; 2nd Examination Report dated Apr. 18, 2018 in Application Serial No. 201380070415.X.
CN; Examination Report dated May 9, 2018 in Application Serial No. 201480023946.8.
PCT; International Search Report and Written Opinion dated Feb. 20, 2018 in US/2017/063061 received May 31, 2018.

\* cited by examiner

SYSTEMS AND METHODS FOR WEB API COMMUNICATION

CROSS-REFERENCE TO RELATED APPLICATIONS

This Non-Provisional Patent Application claims priority to U.S. Provisional Patent Application Ser. No. 62/131,619, entitled "SYSTEMS AND METHODS FOR WEB API COMMUNICATION," and filed Mar. 11, 2015, which is incorporated herein by reference in its entirety.

FIELD

The present disclosure generally relates to communication using web APIs, and more particularly to systems and methods for web API communication over a persistent connection. As used herein, the phrase "web API" refers to a collection of URLs (i.e., web addresses) made available to invoke a predefined set of procedures on a remote device.

BACKGROUND

Communication between devices is typically performed over a network, such as the internet or a local area network. Applications that run on devices may also be in communication with one another. One way that different applications can interact is through APIs. A web API, for example, may enable a third-party application to communicate with a server that hosts data for an existing application.

The web API may require an application to open and close a connection for each request sent to the server. In that regard, each request is a single, disconnected, and isolated call. The overhead associated with opening and closing a connection with each request may result in poor application performance. Communication between the third-party application and the server may appear slow to a client running the third-party application, for example. The appearance of slow communication and/or long load times may turn away consumers that would otherwise use an application.

SUMMARY

A method of communication between devices comprises the steps of receiving a connection request, establishing a connection in response to the connection request, and receiving a first web API request on the connection. The method further comprises the steps of executing a first procedure in response to the first web API request, receiving a second web API request on the connection, and executing at least one of the first procedure or a second procedure in response to the second web API request.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

Systems and methods are disclosed herein for communication between electronic communication devices. As used herein, a "communication device" may refer to any device capable of communication with another device. For example and without limitation, a communication device may refer to a smartphone, PDA, laptop, desktop computer, portable phone, GPS device, car navigation system, wireless printers, or any other device.

Figure 1:
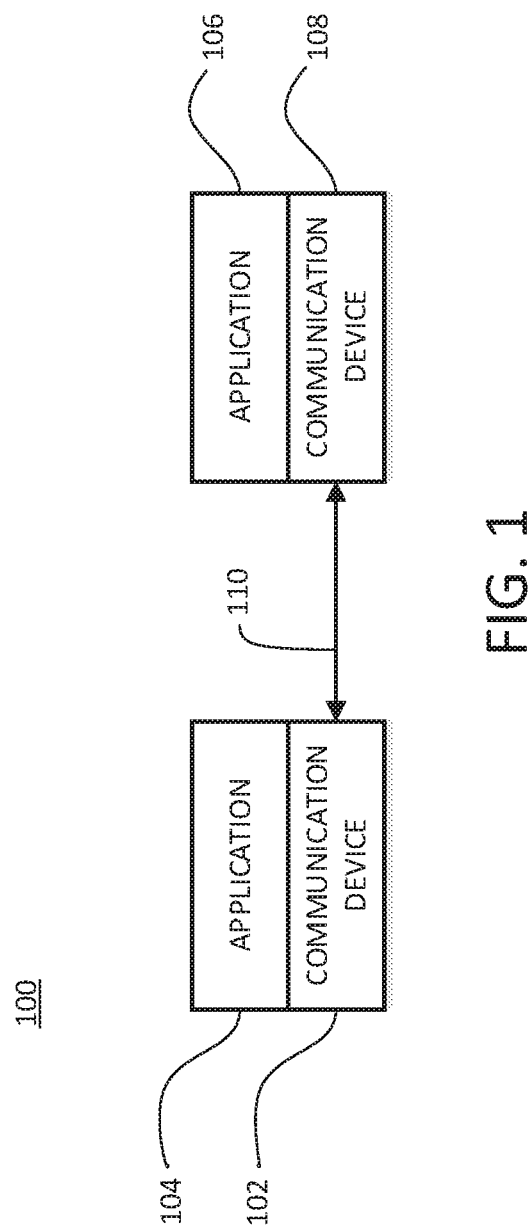
FIG. 1 illustrates a schematic diagram of a system for implementing a web API with a persistent connection according to various embodiments of the disclosure.

Referring to FIG. 1, a system 100 for web application programming interface (API) communication over a persistent connection is illustrated according to various embodiments. System 100 includes a first communication device 102. An application 104 is running on first communication device 102. System 100 also includes a second communication device 108. Second communication device 108 may run a second application 106. First communication device 102 and second communication device 108 may be in communication via network 110. Application 104 may provide data to and/or use data provided by second application 106. Similarly, second application 106 may provide data to and/or use data provided by application 104. In that regard, application 104 and second application 106 may utilize web APIs to communicate with one another.

The procedures of the web API may be called by a first communication device 102 in communication with second communication device 108 over network 110. For example, a procedure to request a folder from second communication device 108 may look like http://fakeurl.com/api/getfolder. When second communication device 108 (e.g., a server) receives the request from first communication device 102 (e.g., a client), the communication device may respond by providing the requested data, in this case folder information, in a predetermined format (e.g. JSON or XML) to the first communication device 102.

In various embodiments, application 104 may use a web API to interface with second application 106. Application 104 running on first communication device 102 may send an API request through network 110 to second communication device 108 running second application 106. Second application 106 may receive and process the API request. In response to receiving the API request, second application 106 may execute a procedure corresponding to the particular API request received.

In order to send and receive API requests, as described in further detail below, a connection is established between first communication device 102 and second communication device 108. By maintaining a persistent connection between first communication device 102 and second communication device 108, system 100 may complete API requests more quickly than a system that opens and closes a connection for every API request.

Figure 2:
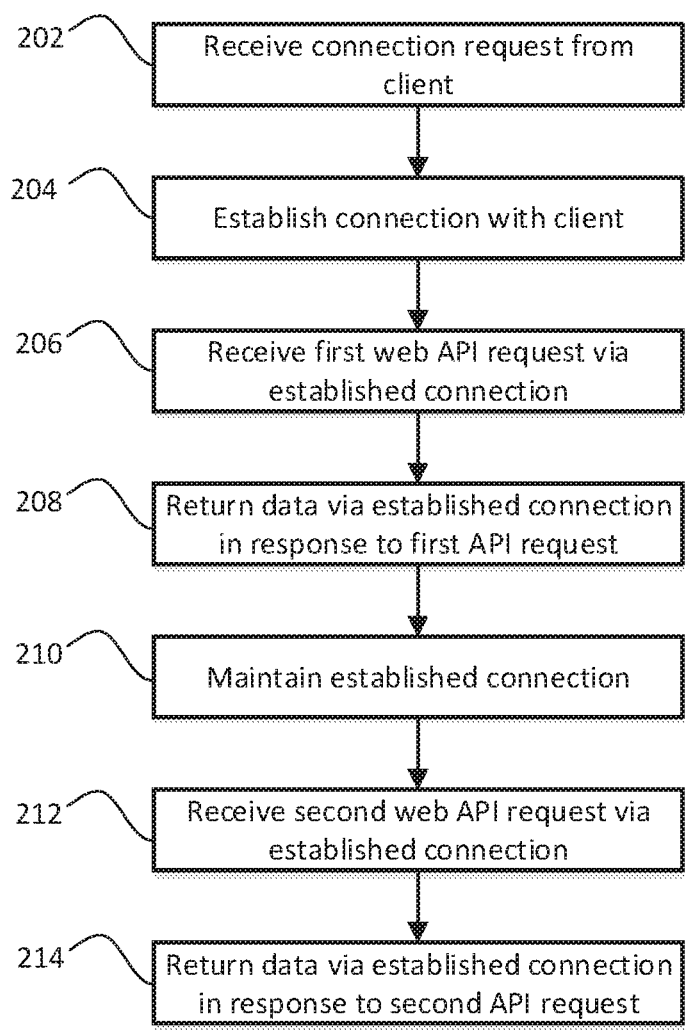
FIG. 2 illustrates a process for a server establishing a connection with a client and transmitting web API requests and responses between the server and client using a persistent connection according to various embodiments.

Referring to FIG. 2, a process 200 for handling web API requests sent by first communication device 102 and received by second communication device 108 is illustrated according to various embodiments. Application 104 running on first communication device 102 may be programmed to provide data or acquire data from second application 106 running on second communication device 108. The second communication device 108 may receive a connection from first communication device 102 (Step 202). Application 104 may be a web client, for example, that submits a connection request to second communication device 108 that is functioning as a server. In response to receiving the request, second communication device 108 may establish a connection with first communication device 102 (Step 204). Once established, the connection may be maintained indefinitely.

In various embodiments, second communication device 108 may maintain a number of active connections in excess of the limits normally inherent on such devices by context switching between active connections with data being sent and active connections that have been idle for a time. Second communication device 108 may switch active connections that have been idle into a data storage system such as a SQL database, a database farm, a hash table, or any other means of storing connection information. When information is received for an active connection that had been idle and is in storage, the active connection may be switch out of storage and into active memory.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

In various embodiments, second communication device 108 may then receive a first API request via the established connection (Step 206). In response to receiving the API request, second communication device 108 returns data via the established connection to first communication device 102 (Step 208). After returning the data, second communication device 108 may maintain the established connection with first communication device 102 (Step 210). The connection may be maintained using various methods discussed in further detail below with reference to FIG. 4.

In various embodiments, second communication device 108 may receive a second web API request via the established connection (Step 212). The second web API request may be received without an additional connection being established between second communication device 108 and first communication device 102. In response to receiving the second web API request, second communication device 108 returns data via the established connection to first communication device 102 (Step 214).

Figure 3:
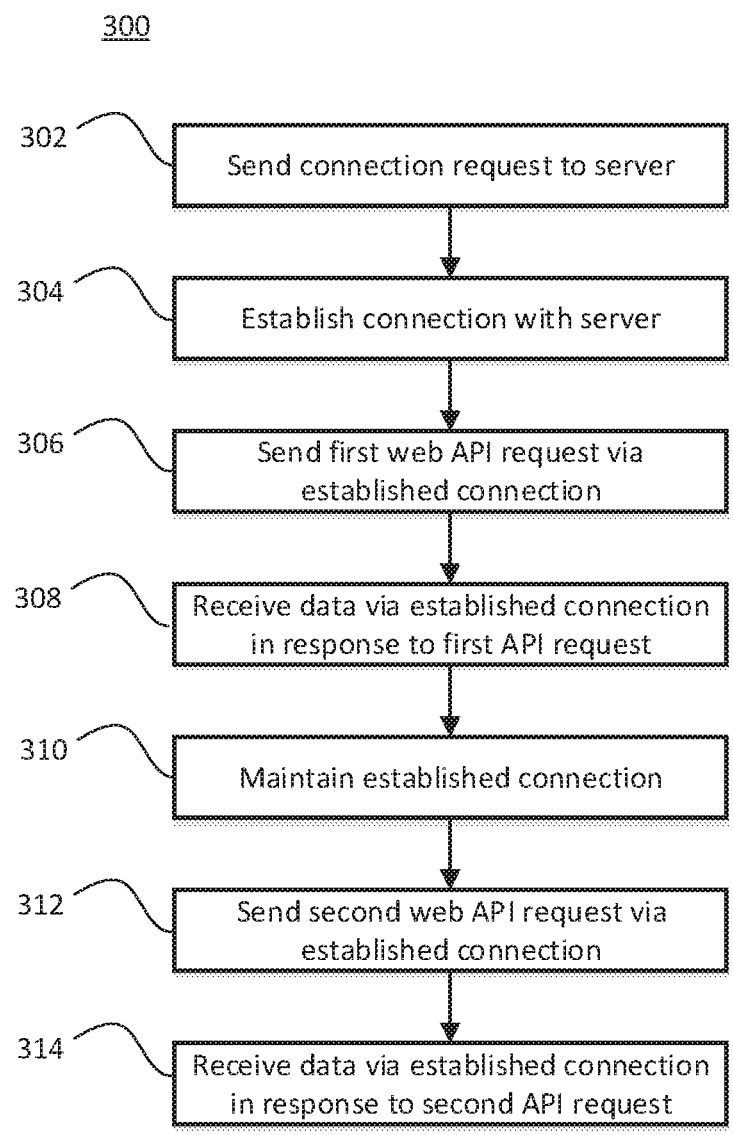
FIG. 3 illustrates a process for a client establishing a connection with a server and transmitting web API requests and responses between the server and client using a persistent connection according to various embodiments.

Referring to FIG. 3, a process 300 for sending API requests from first communication device 102 to second communication device 108 is illustrated according to various embodiments. Application 104 running on first communication device 102 may be programmed to provide data or acquire data from second application 106 running on second communication device 108 by sending an API request to second communication device 108. First communication device 102 may send a connection request to second communication device 108 (Step 302). Application 104 may be a web client, for example, that submits a connection request to second communication device 108, which is functioning as a server. In response to receiving the request, second communication device 108 may establish a connection with first communication device 102 (Step 304). Second communication device 108 may then send a first API request via the established connection (Step 306). In response to receiving the API request, first communication device 102 receives data via the established connection (Step 308). After receiving the data, first communication device 102 may maintain the established connection with second communication device 108 (Step 310). The connection may be maintained using various methods discussed in further detail below with reference to FIGS. 4-5.

In various embodiments, first communication device 102 may send a second web API request via the established connection (Step 312). The second web API request may be sent without establishing an additional connection between first communication device 102 and second communication device 108. In response to sending the second web API request, first communication device 102 receives data via the established connection from second communication device 108 (Step 314).

The methods of receiving web API requests (FIG. 2) and sending web API requests (FIG. 3) may be used, for example, to provide a web site with a nearly instantaneous response time. After the connection between first communication device 102 and second communication device 108 is established, subsequent web API calls no longer impose the overhead of establishing a connection. Thus, the result of the web API call is carried out with reduced latency. In that regard, web API calls using a persistent connection may appear seemingly instantaneous to users in many instances.

Figure 4:
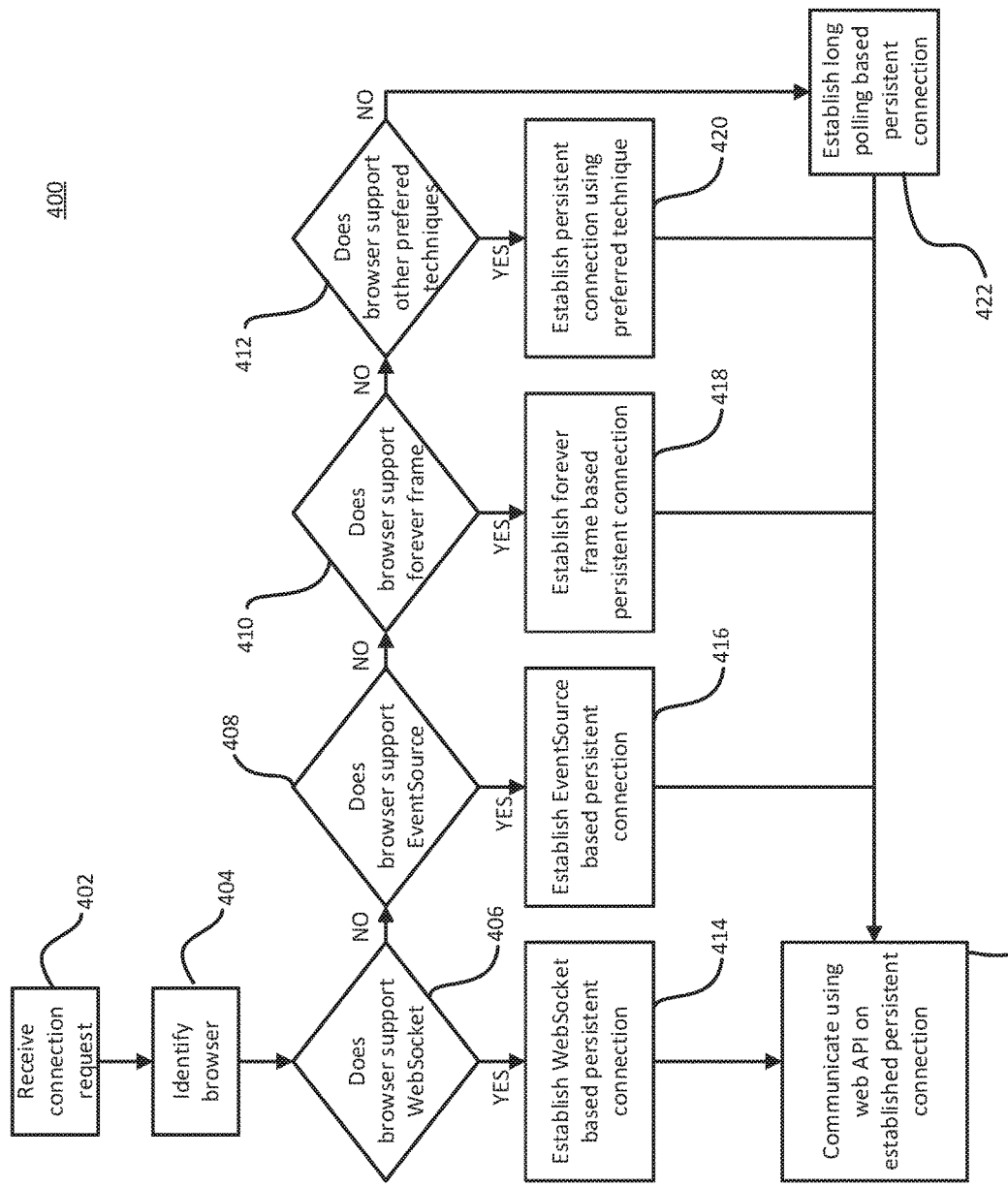
FIG. 4 illustrates a logic for selecting a type of persistent connection with a server to support an API over the connection according to various embodiments.

With reference to FIG. 4, a process 400 for establishing a persistent connection between first communication device 102 and second communication device 108 of FIG. 1 is shown. Second communication device 108 may be operating as a server while interacting with first communication device 102, which may be operating as a web client. Second communication device 108 may receive a connection request from first communication device 102 (Step 402). In response to the request, second communication device 108 may identify the application 104 (e.g., a browser) running on first communication device 102 that is making the connection request (Step 404). Second communication device 108 may identify the browser using device identifiers, operating system identifiers, and/or application identifiers, for example. A browser identifier and device identifier may be provided along with the connection request. For example, second communication device 108 may receive a browser name, browser version, operating system name, and operating version along with a connection request. Second communication device 108 may also request browser name, browser version, operating system name, and operating version in response to receiving a connection request, depending on the configuration of second communication device 108.

Once second communication device 108 has identifying information, second communication device 108 may check the identifying information to determine what type of connection to establish. Second communication device 108 may start by checking whether the identified browser supports WebSocket connections (Step 406). WebSocket is a protocol for providing bi-directional communication between first communication device 102 and second communication device 108. WebSocket connections may only be compatible with modern browsers that are coded to handle Web Socket connections. Although, Web Socket provides a clean, dedicated solution for persistent connections, many devices in use are not compatible with Web Socket connections. Thus, if application 104 running on first communication device 102 is compatible with WebSocket connections, second communication device 108 will establish a WebSocket based persistent connection with first communication device 102 (Step 414). If application 104 running on first communication device 102 is not compatible with WebSocket connections, then second communication device 108 may check for other compatible connection types.

The second communication device 108 may also check whether the identified browser supports EventSource (i.e., server-sent events) connections (Step 408). An EventSource connection also enables a server to push communications to a client, thus enabling bi-directional communication. EventSource connections may be compatible with a different list of browsers and devices than WebSocket connections. Thus, if application 104 running on first communication device 102 is compatible with EventSource, second communication device 108 will establish an EventSource based persistent connection with first communication device 102 (Step 416). If application 104 running on first communication device 102 is not compatible with EventSource connections, then second communication device 108 may check for other compatible connection types.

The second communication device 108 may then check whether the identified browser supports forever frame connections (Step 410). A forever frame connection is another technique to enable a server to push communications to a client, thus enabling bi-directional communication. The forever frame connection may be established by creating a hidden iframe element in a browser and establishing a connection inside the hidden frame. A forever frame connection may be compatible with a different list of browsers and devices than Web Socket and EventSource connections. Thus, if application 104 running on first communication device 102 is compatible with forever framing, second communication device 108 will establish a forever-frame-based persistent connection with first communication device 102 (Step 418). If application 104 running on first communication device 102 is not compatible with forever frame connections, then second communication device 108 may check for other compatible connection types.

In various embodiments, additional preferred techniques may be incorporated into the checks to see which connection technique second communication device 108 will use to establish a persistent connection. To that end, second communication device may check whether the identified browser supports another preferred connection technique (Step 412). If application 104 running on first communication device 102 is compatible with a preferred connection technique, second communication device 108 will establish a persistent connection with first communication device 102 using the preferred technique (Step 420). If application 104 running on first communication device 102 is not compatible with a preferred connection technique, then second communication device 108 may use the default connection. The default connection as illustrated in FIG. 4 comprises establishing a long-polling based persistent connection (Step 422).

Figure 5:
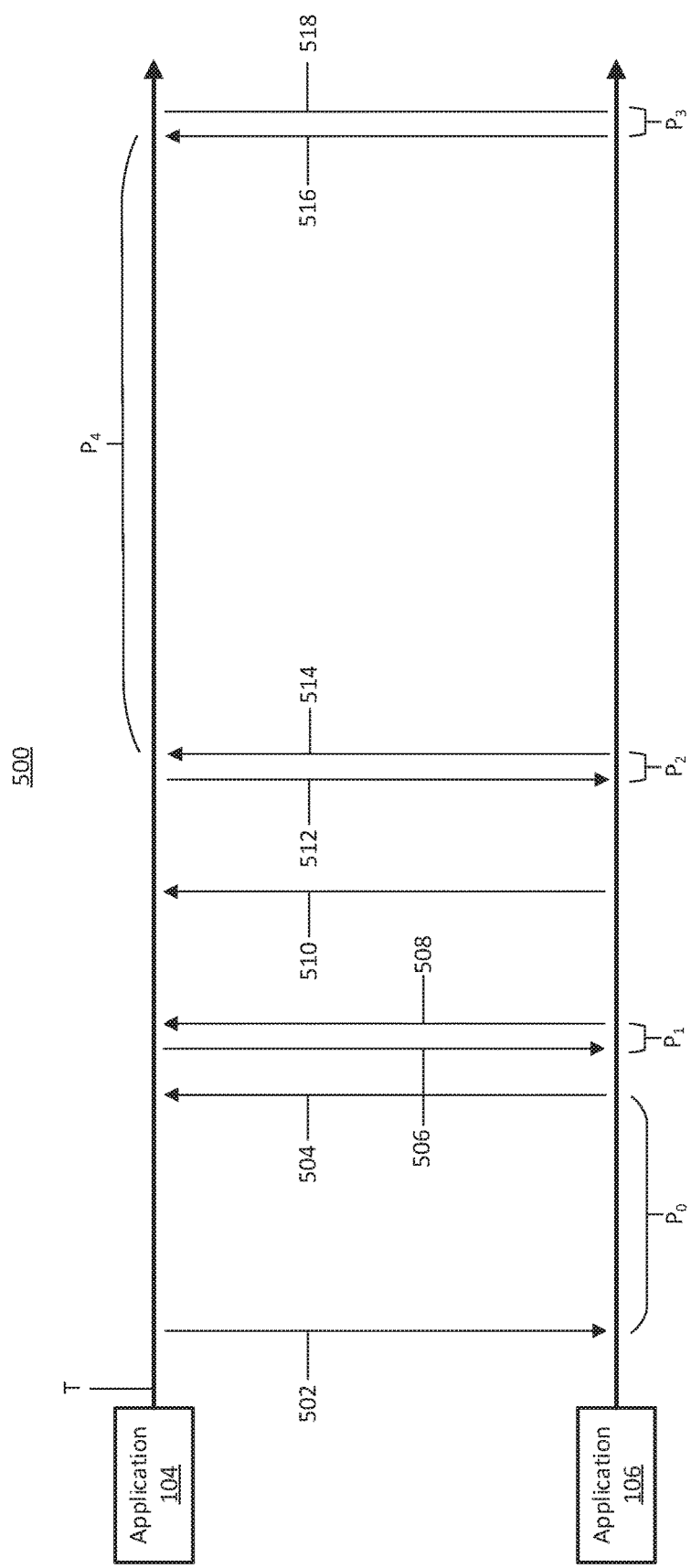
FIG. 5 illustrates an API communication system between two communication devices over time according to various embodiments.

With brief reference to FIG. 1, once a persistent connection is established between first communication device 102 and second communication device 108, application 104 may communicate with second application 106 across network 110 with reduced overhead. Referring to FIG. 5, API communication system 500 is shown over time using a persistent connection between application 104 and second application 106, running on first communication device 102 and second communication device 108, respectively. As illustrated, time passes linearly as position on timeline T moves from left to right. Application 104 may send a request 502 for a connection to second application 106. Application 104 and second application 106 may complete the connection process with communication 504 from second application 106 to application 104 after time period $P_0$ has elapsed. A typical time period $P_0$ for establishing a connection may last from approximately 50 ms to 500 ms, depending on latency between communication devices.

After the connection is established, applications running on first communication device 102 and second communication device 108 may communicate using a web API over the established, persistent connection. Application 104 sends an API request 506 to second application 106. Second application 106 may locally execute a function corresponding to the API request 506 and then return corresponding data 508. The time period $P_1$ from sending the API request 506 to returning corresponding data 508 may be approximately 12 ms, for example. If the connection were closed within 10 ms after returning corresponding data 508 then the overhead for a single API communication between application 104 and second application 106 would be $P_0+P_1+10$ ms. However, because a persistent connection has been established (as illustrated in FIG. 4, for example) the connection remains open after second application 106 returns corresponding data 508.

Second communication device 108 running application 106 may then push information 510 to application 104 over the established, persistent connection as information 510 becomes available. For example, application 104 may be a text-based chat application that sends and receives chat messages through second application 106. Information 510 may indicate that a user is typing a chat message directed to application 104. Second application 106 may provide information 510 to application 104 so that application 104 can display an indicator that the user is typing a message. Information 510 is passed to application 104 without application 104 directly requesting information 510. In that regard, API communication system 500 may eliminate the overhead that application 104 would otherwise incur to receive information 510 because application 104 can simply listen on an established, persistent connection rather than repeatedly establishing a new connection (incurring connection overhead time period $P_0$ each time) to request information 510.

Application 104 may then send a second API request 512 to second application 106 using API communication system 500 with an established, persistent connection. Application 104 may send second API request 512 without establishing a new connection (and without incurring overhead time period $P_0$ for establishing a connection). Second application 106 may process second API request 512 and return results 514 after time period $P_2$. Time period $P_2$ may have duration of approximately 14 ms, for example. The connection may remain open during period $P_4$, while waiting for further communication between application 104 and second application 106. Second communication device 108 may send a request 516 to application 104 for information over the established connection. In that regard, a server may communicate with a client by directly requesting information from the client. The client may then provide the requested information 518 to the server after period $P_3$. Information requested by second communication device 108 might be geographic location or local time, for example. The persistent connection (as described with reference to FIGS. 2 through 4) enables near instantaneous communication between a server and a client by reducing the overhead ancillary to typical communications between server and client using an API. In particular, the persistent connection may reduce the time overhead for a given communication by at least the time period $P_0$ typically used to establish a connection.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include connection data and/or like data useful in the operation of the system. As those skilled in the art will appreciate, user computer may include an operating system (e.g., Windows NT, Windows 95/98/2000, Windows XP, Windows Vista, Windows 7, Windows 8, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, solid state disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

As those skilled in the art will appreciate, a device may include but is not limited to an operating system as well as various conventional support software and drivers typically associated with computers. A device may include but is not limited to any suitable personal computer, network computer, workstation, personal digital assistant, cellular phone, smart phone, minicomputer, mainframe or the like. A device can be in a home or business environment with access to a network. In various embodiments, access is through a network or the Internet through a commercially available web-browser software package. A device may implement security protocols such as Secure Sockets Layer (SSL) and Transport Layer Security (TLS). A device may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, solid state storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A method of communication between devices, comprising:
    receiving, by a server, a connection request from a first device;
    determining, by the server, that the first device is incompatible with a first type of connection comprising a WebSocket based connection;
    determining, by the server and in response to the first device being incompatible with the Web Socket based connection, that the first device is compatible with a second type of connection, the second type of connection comprising at least one of an EventSource based connection, a forever frame based connection, or a long polling persistent connection;
    establishing, by the server, a connection in the second type of connection in response to the connection request;
    receiving, by the server, a first web API request on the connection;
    executing, by the server, a first procedure in response to the first web API request;
    receiving, by the server, a second web API request on the connection; and
    executing, by the server, at least one of the first procedure or a second procedure in response to the second web API request.

2. The method of claim 1, wherein the second type of connection comprises the EventSource based connection.

3. The method of claim 2, wherein the second type of connection is selected by the server based at least in part on compatibility of the second type of the connection with the first device transmitting the connection request.

4. The method of claim 2, wherein the connection persists between the first web API request and the second web API request.

5. The method of claim 4, wherein the connection persists after the second web API request.

6. The method of claim 1, further comprising maintaining, by the server, the connection in response to executing the first procedure.

7. The method of claim 1, further comprising switching, by the server, the connection into a data storage system in response to the connection being idle for a predetermined duration.

8. The method of claim 7, further comprising switching, by the server, the connection into active memory in response receiving the second web API request on the connection.

9. The method of claim 7, wherein the data storage system comprises at least one of a database, a database farm, a hash table, or a lookup table.

10. A computer-based system, comprising:
    a processor;

a tangible, non-transitory memory configured to communicate with the processor, the tangible, non-transitory memory having instructions stored thereon that, in response to execution by the processor, cause the processor to perform operations comprising:
receiving, by the processor, a connection request from a communication device;
determining, by the processor, that the communication device is incompatible with a first type of connection comprising a Web Socket based connection;
determining, by the processor and in response to the communication device being incompatible with the Web Socket based connection, that the communication device is compatible with a second type of connection, the second type of connection comprising at least one of an EventSource based connection, a forever frame based connection, or a long polling persistent connection;
establishing, by the processor, a connection to the communication device in the second type of connection in response to the connection request;
receiving, by the processor, a first web API request from the communication device via the connection;
executing, by the processor, a first procedure in response to the first web API request;
returning, by the processor, a result from the first procedure to the communication device via the connection;
maintaining, by the processor, the connection in an open state in response to returning the result from the first procedure to the communication device;
receiving, by the processor, a second web API request from the communication device on the connection; and
executing, by the processor, at least one of the first procedure or a second procedure in response to the second web API request.

11. The computer-based system of claim 10, wherein the second type of connection comprises the EventSource based connection.

12. The computer-based system of claim 11, further comprising selecting, by the processor, the second type of connection based at least in part on compatibility of an application running on the communication device with the second type of the connection.

13. The computer-based system of claim 11, wherein the connection persists between the first web API request and the second web API request.

14. The computer-based system of claim 13, wherein the connection persists after the second web API request.

15. The computer-based system of claim 10, further comprising switching, by the processor, the connection into a data storage system in response to the connection being idle for a predetermined duration.

16. The computer-based system of claim 15, further comprising switching, by the processor, the connection into active memory in response receiving the second web API request on the connection.

17. The computer-based system of claim 15, wherein the data storage system comprises at least one of a database, a database farm, a hash table, or a lookup table.

18. An article of manufacture including a non-transitory, tangible computer readable storage medium having instructions stored thereon that, in response to execution by a processor, cause the processor to perform operations comprising:
receiving, by the processor, a connection request from a communication device;
determining, by the processor, that the communication device is incompatible with a first type of connection comprising a Web Socket based connection;
determining, by the processor and in response to the communication device being incompatible with the Web Socket based connection, that the communication device is compatible with a second type of connection, the second type of connection comprising at least one of an EventSource based connection, a forever frame based connection, or a long polling persistent connection;
establishing, by the processor, a connection to the communication device in the second type of connection in response to the connection request;
receiving, by the processor, a first web API request from the communication device via the connection;
executing, by the processor, a first procedure in response to the first web API request;
maintaining, by the processor, the connection in an open state in response to executing the first procedure;
receiving, by the processor, a second web API request from the communication device on the connection in the open state; and
executing, by the processor, at least one of the first procedure or a second procedure in response to the second web API request.

19. The article of claim 18, wherein the second type of connection comprises the EventSource based connection.

20. The article of claim 19, further comprising selecting, by the processor, the second type of connection based at least in part on compatibility of an application running on the communication device with the second type of the connection.

21. The article of claim 19, wherein the connection persists between the first web API request and the second web API request.

22. The article of claim 21, wherein the connection persists after the second web API request.

23. The article of claim 18, further comprising switching, by the processor, the connection into a data storage system in response to the connection being idle for a predetermined duration.

24. The article of claim 23, further comprising switching, by the processor, the connection into active memory in response receiving the second web API request on the connection.

25. The article of claim 23, wherein the data storage system comprises at least one of a database, a database farm, a hash table, or a lookup table.

* * * * *